(12) United States Patent
Armantrout

(10) Patent No.: US 6,349,199 B1
(45) Date of Patent: Feb. 19, 2002

(54) RELIABLE CONTINUOUSLY OPERATING FIXED CELLULAR TERMINAL

(75) Inventor: Jeffrey A. Armantrout, Cary, NC (US)

(73) Assignee: Ericsson Inc., Research Triangle Park, NC (US)

(*) Notice: Subject to any disclaimer, the term of this patent is extended or adjusted under 35 U.S.C. 154(b) by 0 days.

(21) Appl. No.: 09/022,511

(22) Filed: Feb. 12, 1998

(51) Int. Cl.[7] ................................................. H04M 3/08
(52) U.S. Cl. ..................................... 455/67.1; 455/67.7
(58) Field of Search .............................. 455/517, 510, 455/433, 435, 503, 557, 465, 423, 424, 425, 67.1, 67.7, 113, 550, 575; 379/27, 32, 1

(56) References Cited

U.S. PATENT DOCUMENTS

| | | | | |
|---|---|---|---|---|
| 4,833,702 A | * | 5/1989 | Shitara et al. ............... | 455/465 |
| 5,016,269 A | * | 5/1991 | Rogers ........................ | 455/404 |
| RE34,034 E | * | 8/1992 | O'Sullivan .................. | 455/557 |
| 5,297,203 A | * | 3/1994 | Rose et al. .................. | 455/464 |
| 5,371,783 A | * | 12/1994 | Rose et al. .................. | 455/464 |
| 5,581,804 A | * | 12/1996 | Cameron et al. ........... | 455/54.1 |
| 5,590,403 A | * | 12/1996 | Cameron et al. ........... | 455/51.2 |
| 5,629,948 A | * | 5/1997 | Hagiwara et al. ........... | 371/32 |
| 5,966,428 A | * | 11/1999 | Ortiz Perez et al. ........ | 379/27 |
| 5,983,114 A | * | 11/1999 | Yao et al. .................... | 455/509 |

FOREIGN PATENT DOCUMENTS

| | | | |
|---|---|---|---|
| GB | 2301743 | | 12/1996 |
| WO | 9422255 | | 9/1994 |
| WO | 94/22255 | * | 7/1995 |
| WO | 9519686 | | 7/1995 |
| WO | 95/19686 | * | 7/1995 |

OTHER PUBLICATIONS

Mouly, M. et al, "The GSM System" GSM System for Mobile Communications, Aug. 1993, pp. 466–477, XP002047768.

* cited by examiner

Primary Examiner—Nay Maung
(74) Attorney, Agent, or Firm—Myers Bigel Sibley & Sajovec

(57) ABSTRACT

A cellular terminal adapted to connect a telephone communication device to a cellular telephone network, which terminal includes a transmitter periodically sending a registration signal to the network and a receiver receiving acknowledgement signals sent by the cellular telephone network in response to the registration signals. A counter records the number of consecutive acknowledgement signals not timely received by the cellular terminal (incrementally increasing each time a signal is not timely received, and resetting to zero when a signal is received), with corrective action being initiated to reestablish proper connection between the cellular terminal and the cellular telephone network when the number recorded by the counter exceeds a selected threshold number. Continuous verified interaction of the cellular terminal and cellular telephone network is provided by (1) sending periodic registration messages from the cellular terminal to the cellular telephone network, (2) sending acknowledgement signals from the network to the terminal in response to registration messages, (3) counting the number of consecutive acknowledgement signals not timely received by the cellular terminal, and (4) initiating correction of a failure of interaction of the cellular terminal and cellular telephone network when the counted number of consecutive acknowledgement signals not timely received reaches a selected threshold number. Corrective action may be initiated by signalling an error condition to a user of the fixed cellular terminal and/or by generating an instruction signal causing the fixed cellular terminal to reset.

15 Claims, 2 Drawing Sheets

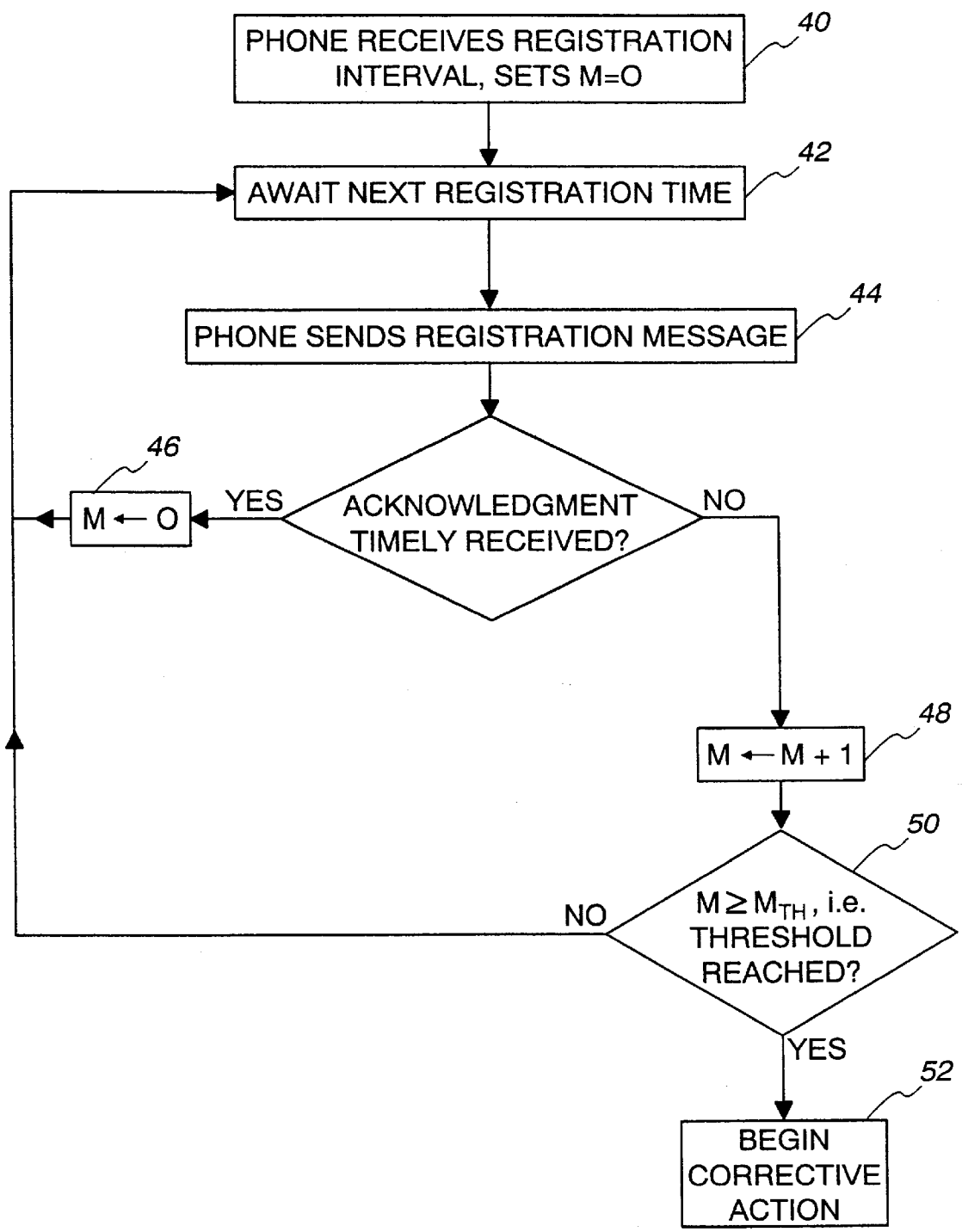

RELIABLE CONTINUOUSLY OPERATING FIXED CELLULAR TERMINAL

BACKGROUND OF THE INVENTION

1. Technical Field

The present invention is directed toward fixed cellular terminals, and more particularly toward single line fixed cellular terminals adapted to provide continuous and reliable telephone service.

2. Background Art

Cellular telephone systems are, of course, growing explosively throughout the world. Such systems are widely known to allow telephones using such systems to be mobile, with the telephones taken by the users wherever they go.

Cellular telephone systems are also advantageously used, however, in conventional applications where the phones are fixed. Particularly in locations where there is a growing need for service but the infrastructure is inadequate or nonexistent, it costly and time consuming the lay conventional phone lines so as to reach each home, office or other location where telephone service is desired. As a result, people in such areas wanting such service can be forced to wait months or even years for service. Further, particularly in low density areas, the cost of laying such lines to widely separated locations can be cost ineffective. Cellular telephone systems provide an ideal solution to such problems, as a cellular tower can be installed to establish a cellular network covering a wide area at a much lower cost, and much more quickly, than conventional telephone service with ground lines to each service location.

In such cases, a fixed cellular terminal (FCT) is provided at the location where telephone service is desired. The fixed cellular terminal (which is one embodiment of a wireless local loop [WLL] terminal) is a cellular communications device, installed at the location where service is desired, to which standard (non-cellular) devices such as dual-tone, multiple frequency (DTMF) telephones, telefaxes and/or modems may be connected by their standard 2-wire connection.

A common configuration for installation at such locations is a single line fixed cellular terminal (SLT), which consists of a single line module (SLM) and power supply with battery backup. The single line module includes a line interface controller through which the standard DTMF devices may be connected, with three such devices typically being connectable at the same time using ordinary telephone jacks. (This thus also makes fixed cellular terminals well suited for temporary use until fixed lines can be laid if that is desired, as the building can be internally wired in a conventional manner with ordinary jacks, wires, etc., with such wiring then readily usable with the ground line once laid by connecting into the building system at the location of the line interface controller.) The SLT provides an interface with the cellular network in accordance with whatever standards may be used by that network. Such a configuration is shown in FIG. 1 and described in further detail below.

Unfortunately, despite the significant advantages as described above for fixed cellular terminals, they encounter problems not typically recognized with mobile cellular telephones. That is, mobile cellular telephones are not expected to operate continuously for extended periods of time, since normal operation of a mobile terminal is usually limited by the life of its battery, and most users of such phones frequently turn them on and off in any event. By contrast, as a replacement for standard wireline phones, fixed cellular terminals are typically required to operate continuously, even though typical software for cellular terminals is neither fault tolerant nor does it automatically recover from all error conditions.

As a result of the above, faults or errors which might be incurred during long periods of continuous operation can cause the terminal to "lock-up" and not process telephone calls. In some such cases, the cellular terminal itself might not know that a problem exists and therefore report incorrectly to the line interface controller that it is operational. This is due to the fact that the software within the terminal is typically implemented in layers, and error detection and fault handling between layers does not identify all error modes. A failure in a lower layer of the software could be undetected by any of the upper layers.

Such problems can have serious consequences. Since the terminal does not recognize that it is not operating properly, it will obviously not take corrective action to correct the problem, nor will it give any indication to the user that he or she should take corrective action. As a result, the terminal may remain inoperable for long periods of time. In a situation where the user does not make many outgoing calls (at which time he or she might discover the error), the user may unknowingly miss many incoming calls. Besides the obvious irritation to customers in being unable to rely on their phone service (imagine a businessperson being away and unable to get through to check messages, perhaps realizing that there are no messages because customers are also unable to get through to your line), lost calls always have the potential for serious adverse consequences, whether they be personal or business.

As a result of this problem, some fixed wireless equipment providers refuse to guarantee continuous operation of their fixed cellular terminals. One solution to the problem has been to turn the cellular terminal off and on at a regular interval (usually many hours apart), as this essentially resets the software to clean up any problems which might have developed in the software, in much the same way that turning a personal computer off and on will reset its software to eliminate problems. However, this reset operation would occur whether or not there is an error condition present and, since the terminal is unable to place or receive calls while resetting, a call which would otherwise get through might be lost. Further, if the error condition arises early in the period between resets, the problems with lost calls and unrecognized inoperability will continue for the long period of time until the next reset. Minimizing the duration of such inoperability by shortening the time between resets would increase the first mentioned problem by proportionately increasing the times when the terminal is unable to place or receive calls.

The present invention is directed toward overcoming one or more of the problems set forth above.

SUMMARY OF THE INVENTION

In one aspect of the present invention, an improvement is provided for a cellular terminal adapted to connect a telephone communication device to a cellular telephone network, which terminal includes a transmitter periodically sending a registration signal to the network and a receiver receiving acknowledgement signals sent by the cellular telephone network in response to the registration signals. The improvement includes a counter recording the number of consecutive acknowledgement signals not timely received by the cellular terminal, and means for initiating corrective action to reestablish proper connection between the cellular terminal and the cellular telephone network when the number recorded by the counter exceeds a selected number.

In preferred forms of this aspect of the present invention, corrective action is initiated by signalling an error condition to a user of the cellular terminal and/or by generating an instruction signal causing the cellular terminal to reset.

In another preferred form of this aspect of the present invention, the selected number used to determine when to initiate corrective action may be changed.

In another aspect of the present invention, an improvement is provided to a fixed cellular terminal to continuously connect a non-mobile telephone communication device to a cellular telephone network, where the terminal includes a transmitter periodically sending a registration signal to the network in accordance with instructions received when initially connecting to the network and a receiver receiving acknowledgement signals sent by the network in response to the registration signals. The improvement includes means for recording whether an acknowledgement signal is received at the cellular terminal in response to a sent registration signal, a counter incrementally increased when the recording means records that an acknowledgement signal was not received, the counter being reset to zero when the recording means records that an acknowledgement signal is received, and means for initiating corrective action to reestablish proper connection between the cellular terminal and the cellular telephone network when the counter exceeds a threshold.

In a preferred form of this aspect of the present invention, the threshold may be configured in accordance with the environment within which the terminal is located.

In other preferred forms of this aspect of the present invention, corrective action is initiated by signalling an error condition to a user of the fixed cellular terminal and/or by generating an instruction signal causing the cellular terminal to reset.

Another aspect of the present invention is a method of providing continuous verified interaction of a cellular terminal with a cellular telephone network, comprising the steps of (1) sending periodic registration messages from the cellular terminal to the cellular telephone network, (2) sending acknowledgement signals from the network to the terminal in response to registration messages, (3) counting the number of consecutive acknowledgement signals not timely received by the cellular terminal, and (4) initiating correction of a failure of interaction of the cellular terminal and the cellular telephone network when the counted number of consecutive acknowledgement signals not timely received reaches a selected number.

In a preferred form of this aspect of the invention, the time interval between periodic registration messages is fixed in response to instructions received from the cellular network when first establishing interaction between the cellular terminal and the cellular telephone network.

In other preferred forms of this aspect of the invention, the initiating step sends a signal to the user indicating a failure of interaction of the cellular terminal and the cellular telephone network, and/or resets the cellular terminal.

It is an object of the present invention to provide a cellular telephone terminal which can be relied upon to provide substantially continuous service for indefinite extended periods of time.

BRIEF DESCRIPTION OF THE DRAWINGS

FIG. 2 is a flow chart illustrating the operation of the improvement of the present invention.

DESCRIPTION OF THE PREFERRED EMBODIMENT

Figure 1:
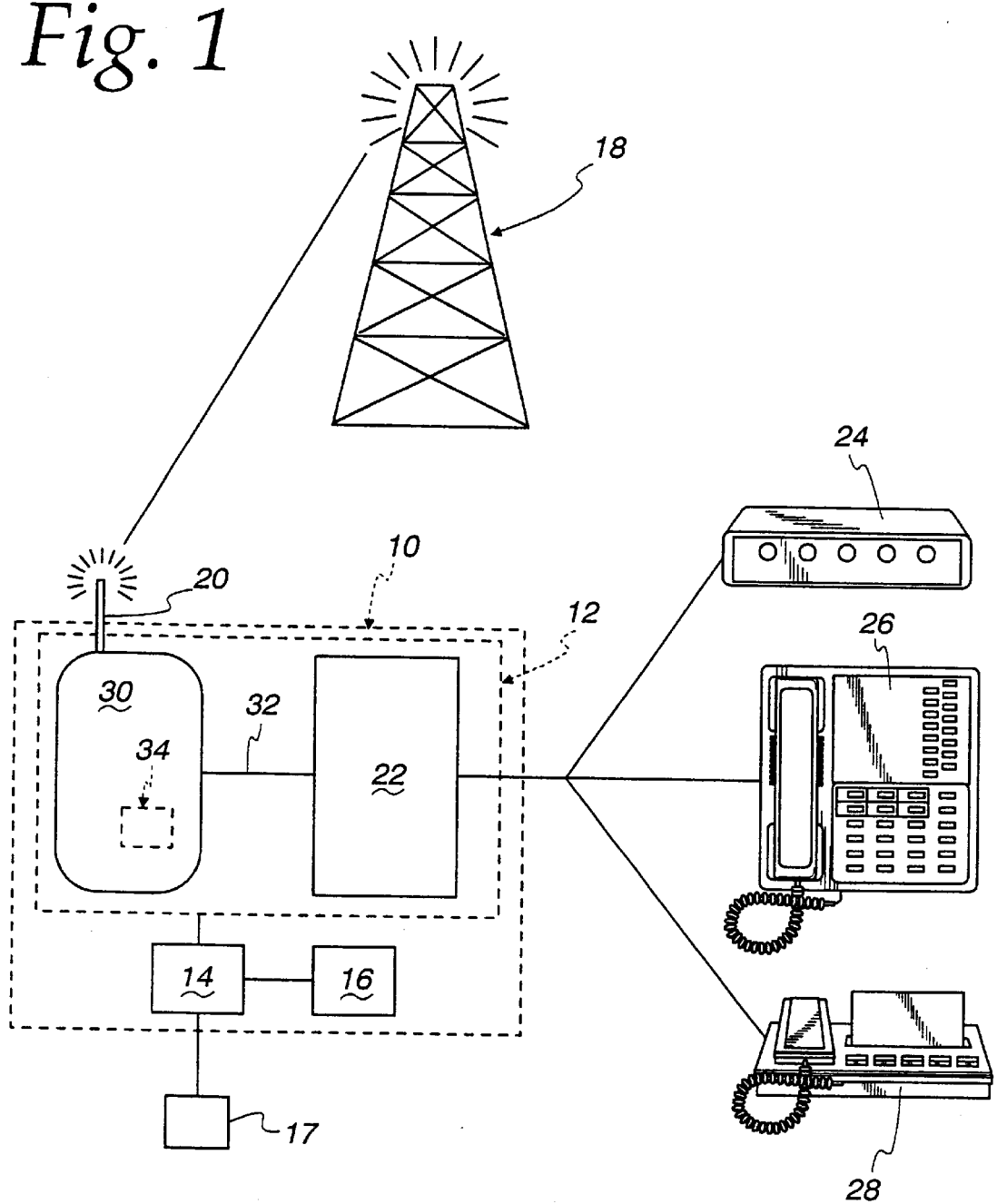
FIG. 1 is a diagram of a single line fixed cellular terminal (SLT) with which the present invention may be used.

A single line fixed cellular terminal (SLT) 10 is shown in FIG. 1. The SLT 10 includes a single line module 12 which is connected through an AC/DC converter 14 having a battery backup 16 to an AC power supply 17.

The SLT 10 includes an antenna 20 connected to the single line module 12 to assist in communication with the remote cellular network 18, typically through a cellular tower.

The single line module 12 includes a suitable connection, such as a line interface controller 22, to standard dual tone, multiple frequency (DTMF) devices, such as a modem 24, telephone 26 and/or telefax 28 as illustrated in FIG. 1. Using ordinary telephone jacks and a 2-wire connection such as is standard in most homes and DTMF devices, up to three such devices such as illustrated can be connected to the SLT 10. It should be recognized that other connections of more devices, and/or different types of such devices, could be used with the present invention, the basic point being to provide communication from a connected device to a cellular network.

The single line module 12 also includes a cellular terminal 30. The cellular terminal 30 is typically connected to the line interface controller 22 by a serial data line 32, though other suitable connections could be used with this invention, the basic point again being to communicate the connected devices through the cellular terminal 30 to the cellular network. The interface from the terminal to the cellular network conforms to IS-136 and IS-54B standards, as is typical for most cellular mobile phones today. Of course, should the standards used for such interface be different or hereafter change, it should be understood that such interfaces should also be usable with the present invention.

The above description is essentially a prior art SLT 10 with which the present invention could be used. Variations of such SLTs, as specifically mentioned as well as others, should be recognized to be advantageously usable consistent the invention described herein once an understanding of the present invention is had.

The present invention is able to accomplish its goals within the limitations of existing air interface standards, without requiring that such interface standards be changed. Therefore, this invention may be readily used with present cellular networks.

Specifically, pursuant to IS-136 standard, cellular networks can request that each terminal present in the network register at periodic intervals by sending a standard message identifying itself. Upon proper receipt of that message, the network will send out an acknowledgement to the terminal. When a terminal first enters a network, the registration time (that is, the period of time between terminal identifying messages) is sent out by the network to the terminal. The registration time can be varied by the network to be from as little as two minutes to infinity (infinity essentially turning off the function). Currently, this function is normally transparent to the user of a cellular phone, who has no indication this it is taking place.

In accordance with the present invention, this identifying or registration signal or message is used to detect, and correct for, any errors in the connection between the terminal and the network.

In accordance with the present invention, a counter 34 is also provided within the terminal 30 to provide operation as described in greater detail below. The number in the counter is identified in the FIG. 2 as "M".

Specifically, operation of the terminal is as shown in the flow chart of FIG. 2.

When the phone (terminal 30) first enters the network, which for a fixed cellular terminal essentially occurs when it is turned on, the phone registers with the network and receives the registration interval from the network as shown at 40. This registration procedure is set by the network and, as previously noted, is a procedure which is currently used with cellular systems. The present invention takes advantage of this procedure, thereby eliminating any necessity that the network adopt additional procedures or signals with the present invention. Since, as previously noted, current systems already allow the registration interval to be selectively set, the only change at the network would simply be to possibly select a different registration interval (depending on that otherwise already used) to accommodate the fixed cellular terminals according to the invention.

At the time of initial registration (when the terminal receives the registration interval), the counter 34 is also set to zero. The terminal 30 then waits for the registration interval (42), at the end of which the standard registration signal is sent by the terminal 30 to the network.

The terminal 30 then checks to see if an acknowledgement is received from the network. In order to recognize this, the terminal 30 keeps track of the sending of registration messages, and then watches in a selected time period thereafter for the acknowledgement signal. If an acknowledgement signal is timely received, the counter 34 is reset to zero (46) and the operation cycles again, with the terminal 30 continuing normal operation for the registration interval, at the end of which it sends another registration message (44).

If, on the other hand, an acknowledgement is not timely received to a registration signal, the counter 34 is incrementally increased (48) and the number in the counter is compared to a selected threshold number (50). Since it is possible during normal operation of the terminal 30 for an acknowledgement signal to fail to be received from the network, a single missed signal is not necessarily indicative of an error in the connection between the terminal 30 and the network. Therefore, a threshold level ($M_{TH}$), greater than or equal to 1, of the number of consecutive missed acknowledgement signals is set within the terminal 30.

Until the threshold level is reached, however, the terminal continues cycling through this procedure of waiting the registration interval, sending a registration message at the end of the interval, checking for a timely acknowledgement, and then checking to see whether the consecutive missed acknowledgements has reached that threshold level.

Once that threshold is reached, the presumption is that there must be an error in the connection from the terminal 30 to the network. Therefore, corrective action is begun (52) as this condition is reached only after multiple failures to communicate back and forth between the terminal 30 and the network. Further, since the registration message used in this preferred embodiment of the present invention is controlled by one of the highest layers of the software in SLT 10, it is very likely that the terminal 30 is functioning properly, without glitches, if it is able to compose and send a registration signal and then recognize receipt of a return acknowledgement signal. As such, every time that occurs, there is a great degree of confidence of proper operation and therefore resetting the counter 34 to zero (essentially indicating a point of reliably proper operation) is appropriate.

A variety of actions can be taken to initiate correction of any errors when the counter 34 reaches the threshold level. As one example, a failure message could be sent to the line interface controller 22, which could be set to automatically take action to correct the problem in response to such a message (for example, to reset the terminal 30, as by turning the power off and on). Alternatively, or additionally, an audio or visual signal could be generated to make the terminal user aware to the probable problem.

In a preferred embodiment, the threshold level for determining that an error must be present can be changed. For example, a user (or service person) could modify the level $M_{TH}$ up or down based on experience with operation of the phone (if the phone seems to frequently recycle despite working fine, they might increase $M_{TH}$, or where the phone seems to be inoperable during long periods before resetting, they might decrease $M_{TH}$). As another example, $M_{TH}$ could be set according to the registration interval used by the network in which the terminal 30 is located (a terminal 30 in a network with a larger registration interval might use a smaller threshold $M_{TH}$). In the latter case, the threshold level could be automatically set in response to the registration interval without requiring any user action.

It should be recognized by those skilled in the art that the above invention can be accomplished with current fixed cellular terminals in which suitable modifications are made to its software. Such operation could, however, be accomplished in a wide variety of manners. Still further, it should be appreciated that such invention could be used not only with fixed cellular terminals but also with conventional mobile cellular telephones should conditions arise in which undetected communication errors become more common with such mobile units (as may occur as battery life continues to increase such that such mobile units are left on for significantly longer periods of time).

It should now be recognized by those skilled in the art that the present invention may be used to ensure reliable substantially continuous operation of a cellular telephone terminal for indefinite extended periods of time. Such reliable operation is a major competitive factor in this industry, and is a particular concern for fixed cellular terminals to which this invention is particularly (but not solely) suited.

Still other aspects, objects, and advantages of the present invention can be obtained from a study of the specification, the drawings, and the appended claims.

What is claimed is:

1. A cellular terminal adapted to wirelessly connect a telephone communication device to a cellular telephone network, said terminal comprising:

a transmitter periodically sending a signal to the network;

a receiver receiving acknowledgement signals sent by the cellular telephone network in response to the signals;

a counter for recording the number of consecutive acknowledgement signals not timely received by the cellular terminal; and means for generating an instruction signal causing the cellular terminal to be reset when the number recorded by the counter exceeds a selected number by causing the terminal to carry out operations of a power on reset of the terminal.

2. The cellular terminal of claim 1 wherein said generating means further generates a signal indicating an error condition to a user of the cellular terminal.

3. The cellular terminal of claim 1 further comprising means for changing said selected number.

4. A fixed cellular terminal adapted to continuously connect a non-mobile telephone communication device to a cellular telephone network, said terminal comprising:

a transmitter periodically sending a registration signal to the network in accordance with instructions received when initially connecting to the network;

a receiver receiving acknowledgement signals sent by the network in response to the registration signals;

means for recording whether an acknowledgement signal is received at the cellular terminal in response to a sent registration signal;

a counter incrementally increased when the recording means records that an acknowledgement signal was not received, said counter being reset to zero when said recording means records that an acknowledgement signal is received; and means for generating an instruction signal causing the cellular terminal to be reset when the counter exceeds a threshold by causing the terminal to carry out operations of a power on reset of the terminal.

5. The fixed cellular terminal of claim 4 further comprising means for configuring said threshold.

6. The fixed cellular terminal of claim 4 wherein said means for generating an instruction signal causing the cellular terminal to be reset when the counter exceeds a threshold further generates a signal indicating an error condition to a user of a telephone communication device connected to the fixed cellular terminal.

7. A method for providing continuous verified interaction of a cellular terminal with a cellular telephone network, comprising the steps of:

sending periodic registration messages from the cellular terminal to the cellular telephone network;

sending acknowledgement signals from the network to the terminal in response to registration messages;

counting the number of consecutive acknowledgement signals not timely received by the cellular terminal in response to said registration messages sent by the cellular terminal; and resetting the cellular terminal to reestablish proper interaction of the cellular terminal and the cellular telephone network when the counted number of consecutive acknowledgement signals not timely received by the terminal in response to said registration messages reaches a selected number by causing the terminal to carry out operations of a power on reset of the terminal.

8. A method for providing continuous verified interaction of a cellular terminal with a cellular telephone network, comprising the steps of:

sending periodic registration messages from the cellular terminal to the cellular telephone network;

fixing the time interval between periodic registration messages in response to instructions received from the cellular network when first establishing interaction between the cellular terminal and the cellular telephone network;

sending acknowledgement signals from the network to the terminal in response to registration messages;

counting the number of consecutive acknowledgement signals not timely received by the cellular terminal in response to said registration messages sent by the cellular terminal; and resetting the cellular terminal to reestablish proper interaction of the cellular terminal and the cellular telephone network when the counted number of consecutive acknowledgement signals not timely received by the terminal in response to said registration messages reaches a selected number.

9. The method of claim 7, further comprising sending a signal to the user indicating a failure of interaction of the cellular terminal and the cellular telephone network when the counted number of consecutive acknowledgement signals not timely received by the terminal in response to said registration messages reaches a selected number.

10. The cellular terminal of claim 1, wherein said means for generating an instruction signal causing the cellular terminal to be reset when the number recorded by the counter exceeds a selected number causes power to said terminal to be turned off and then on.

11. The fixed cellular terminal of claim 4, wherein said means for generating an instruction signal causing the cellular terminal to be reset when the number recorded by the counter exceeds a threshold causes power to said terminal to be turned off and then on.

12. The method of claim 7, wherein said resetting the cellular terminal to reestablish proper interaction of the cellular terminal and the cellular telephone network when the counted number of consecutive acknowledgement signals not timely received by the terminal in response to said registration messages reaches a selected number comprises turning power to said terminal off and then on.

13. The cellular terminal of claim 1, wherein an interval between the transmitter sending the signal to the network is established by the network, the cellular terminal further comprising means for establishing the selected number based on the interval between the transmitter sending the signal to the network.

14. The fixed cellular terminal of claim 4, wherein an interval between the transmitter periodically sending a registration signal to the network is established by the instructions received when initially connecting to the network, the fixed cellular terminal further comprising means for establishing the threshold based on the interval between the transmitter sending the registration signal to the network.

15. The method of claim 8, further comprising establishing the selected number based on the time interval between the periodic registration messages.

* * * * *